United States Patent [19]

Tseng

[11] Patent Number: 5,595,110
[45] Date of Patent: Jan. 21, 1997

[54] SANITARY CHOPPING PLATE STRUCTURE

[76] Inventor: Cheng-Tzu Tseng, No. 172, Wu-Chi Road, Wu-Chi Town, Taichung Hsien, Taiwan

[21] Appl. No.: 606,026

[22] Filed: Sep. 29, 1995

[51] Int. Cl.$^6$ ............................................. B23Q 3/00
[52] U.S. Cl. ................... 99/483; 99/484; 99/646 R; 269/289 R; 165/185
[58] Field of Search .................. 99/484, 483, 646 R, 99/422, 425, 445, 340, 357, 339; 269/289 R, 302.1, 13, 15; 165/185

[56] References Cited

U.S. PATENT DOCUMENTS

| | | | |
|---|---|---|---|
| 3,106,236 | 10/1963 | Brady | 99/445 X |
| 3,385,357 | 5/1968 | Burg | 99/425 X |
| 4,798,372 | 1/1989 | Tingle | 269/289 R X |

FOREIGN PATENT DOCUMENTS

| | | | |
|---|---|---|---|
| 12437 | 5/1934 | Australia | 269/289 |

*Primary Examiner*—Reginald Alexander
*Attorney, Agent, or Firm*—Pro-Techtor International

[57] ABSTRACT

An improvement of a sanitary chopping plate of the Ser. No. 08/284,854 application now U.S. Pat. No. 5,485,937, wherein it comprises at least a bottom disk having a plain plane and at least a chopping plate, and is characterized by that: the bottom of the chopping plate has a recess which is conformed in shape with the bottom disk for receiving the chopping plate; the bottom disk is structurally simpler and is easier and more convenient for manufacturing and processing, and more, cost of production thereof is largely reduced; the bottom disk further is provided with a plurality of annular and radiant grooves having heat sinking function, thereby the bottom disk can also be used as a defrosting plate.

3 Claims, 3 Drawing Sheets

SANITARY CHOPPING PLATE STRUCTURE

BACKGROUND OF THE INVENTION

1. Field of the Invention

The present invention is an improvement of a SANITARY CHOPPING PLATE which was filed on Aug. 2, 1994 and has a filing No. 08/284,854 now U.S. Pat. No. 5,485,937, and which is attached herewith for reference, wherein there is a bottom disk available for a plurality of chopping plates to be placed thereon, various kind of food can be treated on their respective plate for maintaining sanitation, this structure an also prevent water and the food being chopped from dropping out of their chopping plate.

2. Description of the Prior Art

In the SANITARY CHOPPING PLATE of Ser. No. 08/284,854 application now U.S. Pat. No. 5,485,937, a plurality of feet are provided around the lower edge of a bottom disk, an inclining surface is formed between each foot and the top edge of the bottom disk and a groove is provided around the periphery of the plain plane formed by the top surface of the bottom disk, the shape of the bottom disk is thereby a complicated one this is more difficult for producting and processing, and thereby increases cost of production.

SUMMARY OF THE INVENTION

Improvement of the present invention as compared to the SANITARY CHOPPING PLATE of Ser. No. 08/284,854 application now U.S. Pat. No. 5,485,937 is that, in the present invention, the bottom disk is structurally simpler and is easier and more convenient for manufacturing and processing, and moreover, cost of production thereof is largely reduced to meet economy requirement of the public.

Further, beside improvement in shape of the bottom disk, the present invention provides on the plain plane formed by the top surface of the bottom disk with a plurality of annular and radiant grooves having heat sinking function, thereby the bottom disk can also be used as a defrosting plate.

The present invention will be apparent in its characteristics after reading the detailed description of the preferred embodiment thereof in reference to the accompanying drawings.

DETAILED DESCRIPTION OF THE PREFERRED EMBODIMENT

Figure 1:
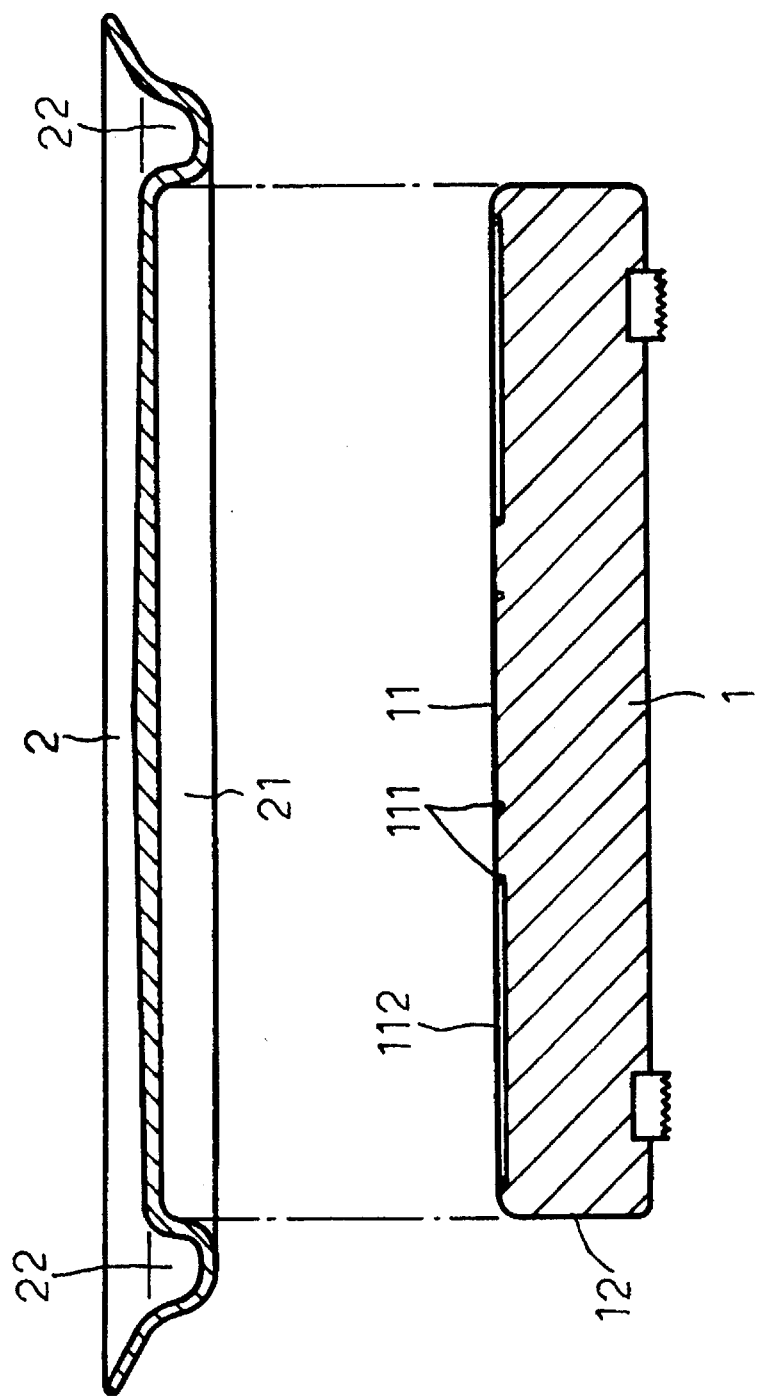
FIG. 1 is a lateral analytical sectional view of the present invention.
Figure 2:
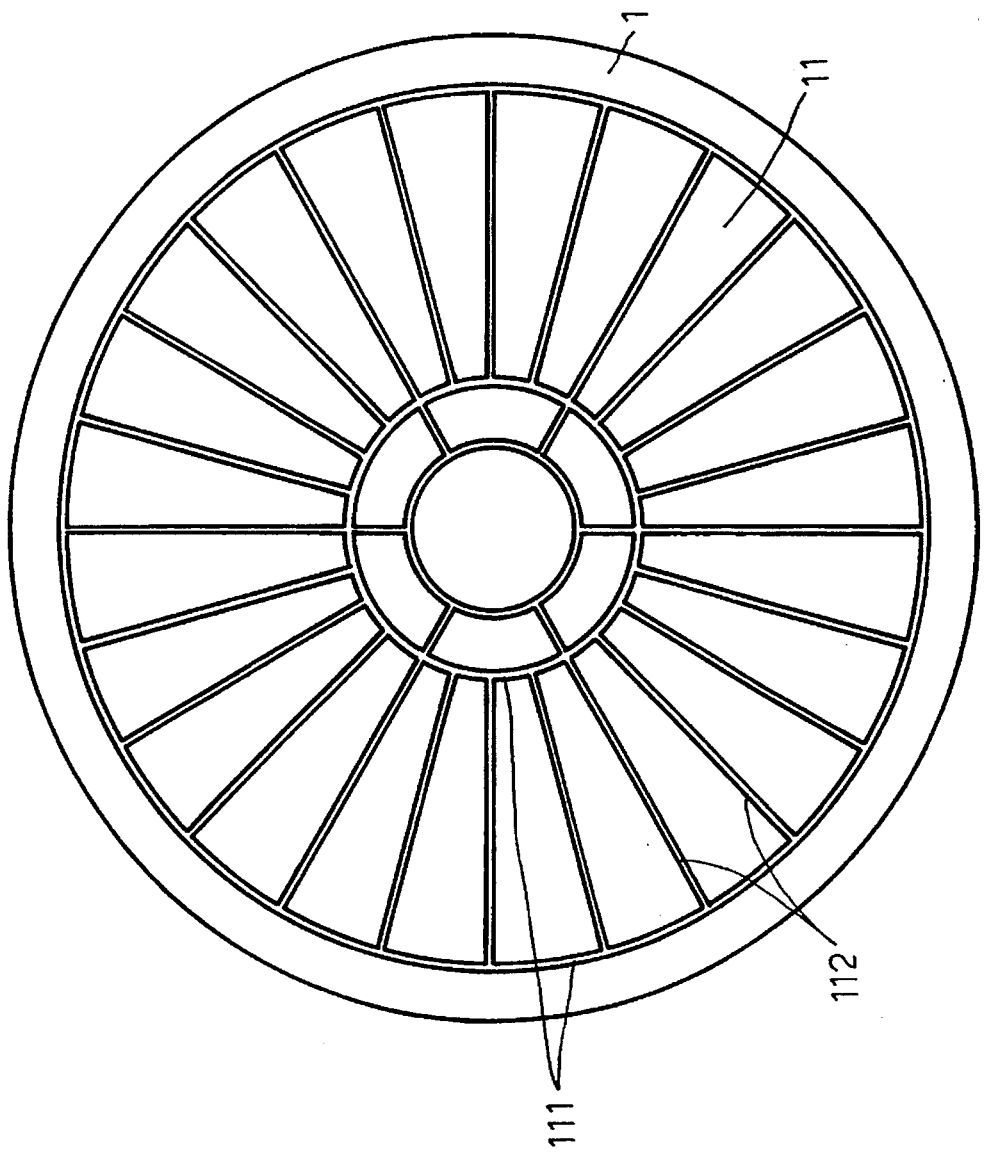
FIG. 2 is a top view of the bottom disk of the present invention.

Referring to FIG. 1 and 2, wherein a bottom disk 1 and at least one chopping plate 2 are provided, as an principal aspect of the present invention, a plain plane 11 is formed by the top surface of the bottom disk 1, and a plurality of annular grooves 111 and radiant grooves 112 having heat sinking function are provided on the plain plane 11. In this way, plus the material (aluminum, or aluminum alloy etc.) it is made of, the bottom disk 1 can also be used as a defrosting plate.

Besides, the periphery of the bottom disk 1 of the present invention is a vertical surface 12, while the bottom of the chopping plate 2 has a recess 21 which is conformed in shape with the bottom disk 1 for receiving the same, in this aspect, the present invention is simplier as to the shape thereof than that of the bottom disk 1, and is easier for production and processing thereof, yet cost of production thereof is largely reduced so as to meet economy requirement of the public.

Figure 3:
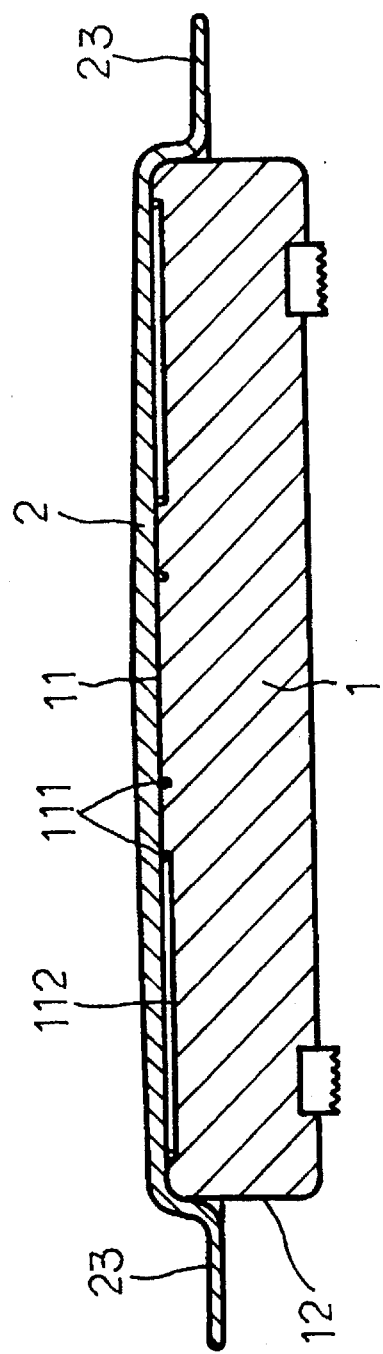
FIG. 3 is a schematic sectional view of another preferred embodiment of the chopping plate of the present invention.

Further as shown in FIG. 1, the chopping plate 2 of the present invention has beside the function as stated in the SANITARY CHOPPING PLATE of Ser. No. 08/284,854 application now U.S. Pat. No. 5,485,937 by virtue of a water collecting groove 22 formed by extension of the slice-like body of the chopping plate 2, it can alternatively have a plain extension surface 23 formed on the periphery of the slice-like body of the chopping plate 2 (referring to FIG. 3). Thereby, it can be used to do the cutting as well as chopping work on food which has a larger volume but has less water content beside the convenience it has for being held.

My invention may assume numerous forms and is to be construed as including all modifications and variations falling within the scope of the appended claims.

I claim:

1. A sanitary chopping plate structure, comprising:

a bottom disk with a substantially planar upper surface, and a chopping plate wherein;

said upper surface of said bottom disk includes a plurality of annular grooves and a plurality of radiant grooves, a lower surface of said chopping plate includes a recess which conforms in shape to an upper end of said bottom disk so that said recess receives said upper end of said bottom disk.

2. The sanitary chopping plate as defined in claim 1, wherein;

an extension surface is formed on the periphery of said chopping plate.

3. The sanitary chopping plate as defined in claim 1, wherein.

a water collecting groove is formed on the periphery of said chopping plate.

* * * * *